United States Patent
Egan et al.

(12) 
(10) Patent No.: US 6,821,156 B1
(45) Date of Patent: Nov. 23, 2004

(54) METHOD AND SLIDING CONNECTOR AND CIRCUIT CARD COMBINATION FOR IMPLEMENTING HOT PLUGGING PROTECTION FOR REGULATOR, POWER SUPPLIES AND SYSTEM CARDS

(75) Inventors: Patrick Kevin Egan, Rochester, MN (US); Gary Allen Thompson, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/619,734

(22) Filed: Jul. 15, 2003

(51) Int. Cl.[7] .............................................. H01R 24/00
(52) U.S. Cl. ...................................................... 439/630
(58) Field of Search .......................... 439/630, 79, 352, 439/354, 357, 650, 159, 326

(56) References Cited

U.S. PATENT DOCUMENTS 6,328,590 B1 * 12/2001 Linnell ....................... 439/352
6,595,803 B2 * 7/2003 Akagi et al. ................ 439/630
2004/0127102 A1 * 7/2004 Poplawski et al. .......... 439/630

* cited by examiner

*Primary Examiner*—J. F. Duverne
(74) *Attorney, Agent, or Firm*—Joan Pennington

(57) ABSTRACT

A method and a combination of a hot plug sliding connector and a circuit card are provided for implementing hot plugging protection regulator cards, power supply cards, system cards and the like. A respective isolation circuit is coupled to each voltage input and voltage output of the circuit card to be connected to the hot plug sliding connector. The hot plug sliding connector has an elongated slot for slidingly receiving the circuit card along the length of the elongated slot. A plurality of cooperating electrically connecting portions of the connector and circuit card are provided in mating engagement with the circuit card inserted into a final position in the connector. The plurality of cooperating electrically connecting portions are spaced apart by a respective predefined null, non-electrically connecting portion arranged to avoid shorting between cooperating electrically connecting portions during the sliding insertion of the circuit card into the hot plug sliding connector.

14 Claims, 4 Drawing Sheets

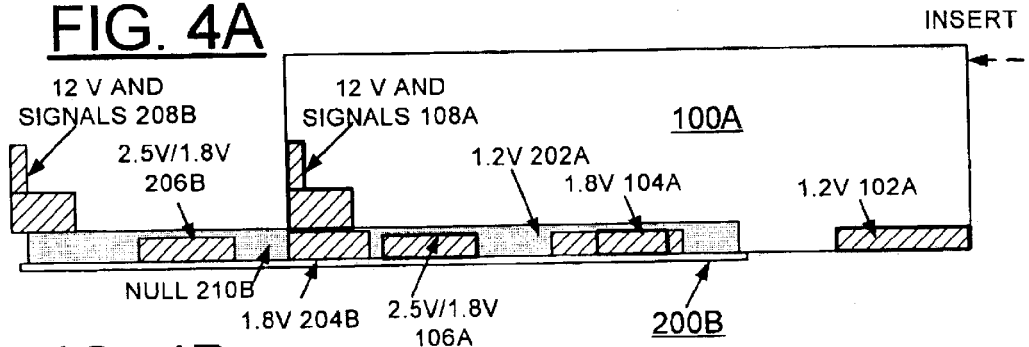
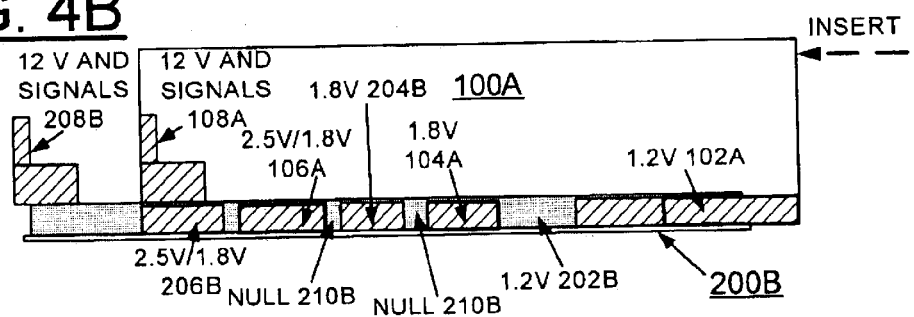
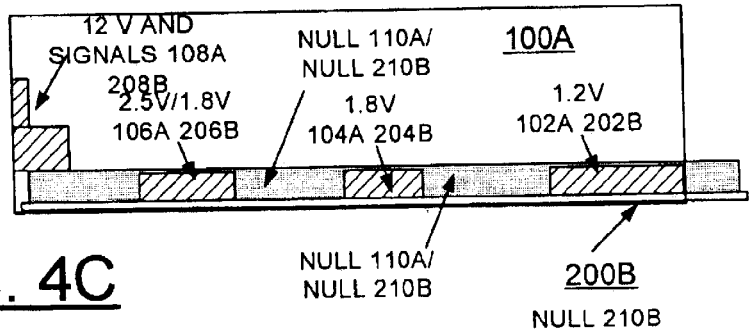

METHOD AND SLIDING CONNECTOR AND CIRCUIT CARD COMBINATION FOR IMPLEMENTING HOT PLUGGING PROTECTION FOR REGULATOR, POWER SUPPLIES AND SYSTEM CARDS

FIELD OF THE INVENTION

The present invention relates generally to the data processing field, and more particularly, relates to a method and a hot plug sliding connector and circuit card combination for implementing hot plugging protection for regulator cards, power supply cards, system cards and the like.

DESCRIPTION OF THE RELATED ART

As used in the following description and claims, it should be understood that circuit card includes various conductive media including a bus bar, a copper substrate and a flex cable.

Often it is desirable to install a circuit card, such as a regulator circuit card, power supply card, system card and the like, during normal power on operation of a system, such as a data processing system. This operation is typically referred to as hot plugging or a hot plug operation. However, such hot plugging must avoid any unsafe power condition so that the regulator card, power supply card, or system card are not damaged or destroyed.

Hot plugging of some known regulators and power supplies has been done by mating to a connector at an end of the circuit card. In this hot plugging operation, the circuit card is positioned for mating to the connector in the same direction that the circuit card is being plugged into the connector.

Another hot plugging solution commonly used is called a blind swap. This blind swap method is done by first positioning the card over the connector and having some mechanical method to cam the card down once the card is positioned in the correct location over the connector. A significant problem with this blind swap method is the space required. The height of the connector and additional room above the card is required to cam the card downwardly for the blind swap method. Due to required system density, it may not be possible to dedicate, for example, 20–25% of available packaging room for this blind swap function. Also, the cam force required for a large power connector could be difficult or impossible with the blind swap method.

A need exists for a mechanism to implement hot plugging protection for regulator cards, power supply cards, system cards and the like in a system that only has front access. In addition, it is desirable to enable a regulator card, power supply card, system card and the like to mate with a system board that is under the card rather than behind it.

SUMMARY OF THE INVENTION

A principal object of the present invention is to provide a method and a combination of a hot plug sliding connector and a circuit card for implementing hot plugging protection for regulator cards, power supply cards, system cards and the like. Other important objects of the present invention are to provide such method and combination for implementing hot plugging protection substantially without negative effect and that overcome many of the disadvantages of prior art arrangements.

In brief, a method and a combination of a hot plug sliding connector and a circuit card are provided for implementing hot plugging protection for regulator cards, power supply cards, system cards and the like. A respective isolation circuit is coupled to each voltage input, and voltage output of the circuit card to be connected to the hot plug sliding connector. The hot plug sliding connector has an elongated slot for slidingly receiving the circuit card along the length of the elongated slot through the hot plug sliding connector. Both the sliding connector and the circuit card include a plurality of cooperating electrically connecting portions for mating engagement with the circuit card inserted into a final position in the hot plug sliding connector.

One of the cooperating electrically connecting portions of the circuit card is connected to one respective isolation circuit. The plurality of cooperating electrically connecting portions of the sliding connector and the circuit card are spaced apart by a respective predefined null, non-electrically connecting portion arranged to avoid shorting between adjacent ones of the plurality of cooperating electrically connecting portions of the connector during the sliding insertion of the circuit card into the hot plug sliding connector.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A, 4B, and 4C are side views illustrating the sliding insertion of the exemplary circuit card apparatus into the hot plug sliding connector of FIGS. 2 and 3 in accordance with the preferred embodiment;

DETAILED DESCRIPTION OF THE PREFERRED EMBODIMENTS

In accordance with features of the preferred embodiment, a method and a hot plug sliding connector and circuit card combination are provided for implementing hot plugging protection for regulator cards, power supply cards, system cards and the like. The method and hot plug sliding connector of the preferred embodiment enable a hot plugging operation with a regulator card, a power supply card, or a system card to be inserted into a system that only allows front access. Also the regulator card, power supply card, or system card can mate with a system board that is under the regulator card, power supply card, or system card rather than behind it. During a hot plugging operation, the circuit card is slidingly inserted along the length of the hot plug sliding connector. Mating electrically conducting portions of both the connector and circuit card are spaced apart by null, non-electrically conducting portions so that electrically conducting portions or contact pads of the circuit card can not bridge between any two electrically conducting portions of the connector. All circuit card contact pads are high impedance due to field effect transistor (FET) isolation during a hot plugging operation.

Figure 1:
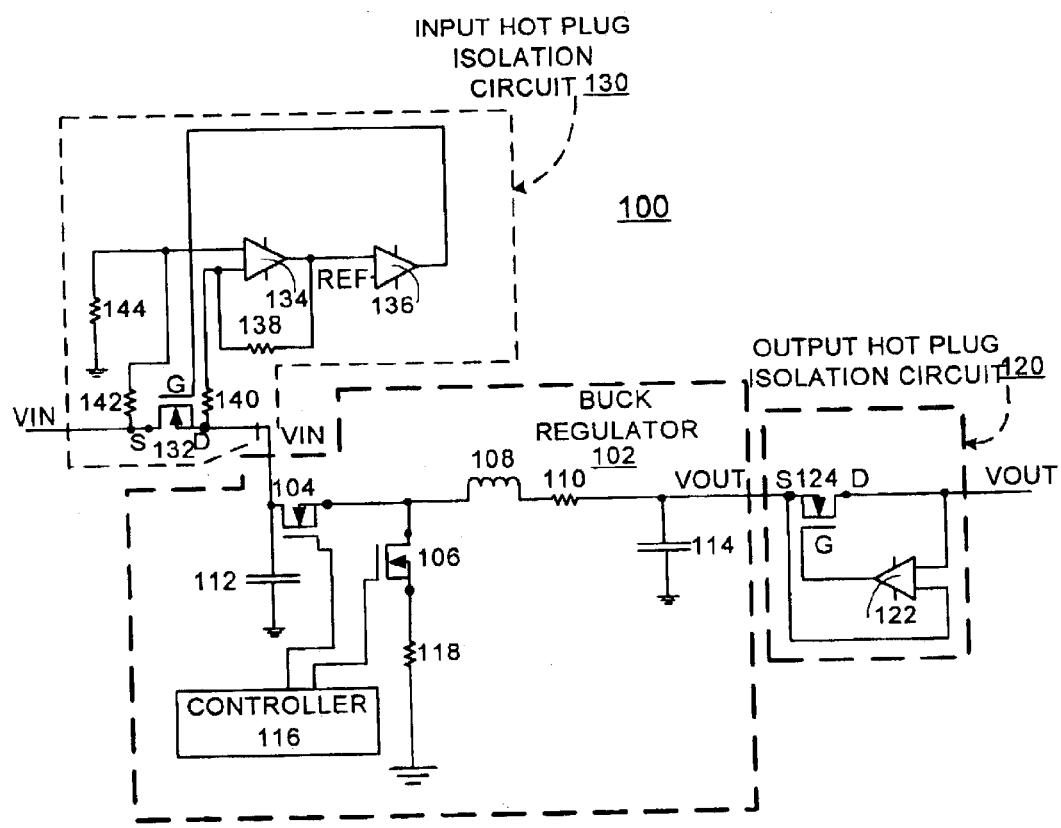
FIG. 1 is a schematic diagram representation illustrating an exemplary regulator apparatus in accordance with the preferred embodiment.

Having reference now to the drawings, in FIG. 1, there is shown an exemplary regulator apparatus generally designated by the reference character 100 for implementing a hot plugging protection method in accordance with the preferred embodiment.

Regulator apparatus 100 only is provided as an example for understanding the method and hot plug sliding connector for implementing hot plugging protection of the preferred embodiment. It should be understood that the present invention is not limited to regulator apparatus 100. It should be understood that the principles of the present invention are equally applicable to various other apparatus including power supply cards, system cards and the like.

Regulator apparatus 100 includes a buck regulator 102 connected between a regulator input VIN and a regulator output VOUT. Buck regulator 102 includes a pair of field effect transistors (FETs) 104, 106 with an inductor 108 and a resistor 110 coupled in series between FET 104 and the output voltage VOUT. The buck regulator 102 includes an input capacitor 112, an output capacitor 114 a controller 116, and a resistor 118 coupled between FET 106 and ground. The input voltage VIN is converted to the output voltage VOUT by controlling the on time of FET 104 and the off time FET 106 using the controller 116 that provides a control or gate input to each FET 104, 106.

In accordance with features of the preferred embodiment, an isolation circuit is provided for hot plugging protection on all voltage inputs or outputs to be connected to a hot plug sliding connector. A circuit card carrying a power supply, regulator or the like of the preferred embodiment, such as further illustrated and described with respect to FIGS. 2, 3, 4A, 4B, and 4C and FIGS. 5 and 6, has a respective isolation circuit coupled to each one of multiple voltage inputs and voltage outputs to be connected to a hot plug sliding connector. For example, the isolation circuits include a respective output ORing diode or FET coupled to each voltage output and an input isolation FET coupled to each voltage input. The isolation circuits of the preferred embodiment makes all outputs of the power supply, regulator, system card or the like high impedance during the sliding insertion through the hot plug connector. The isolation FETs remain off in a high impedance state until the regulator is completely inserted through the hot plug connector to a final mating position of the circuit card and the hot plug connector.

As shown in FIG. 1, exemplary regulator apparatus 100 includes an output hot plug isolation circuit generally designated by 120 on the voltage output VOUT and an input hot plug isolation circuit generally designated by 130 on the voltage input VIN.

Output hot plug isolation circuit 120 functions as an output ORing device to prevent negative current into the buck regulator 102. Output hot plug isolation circuit 120 protects for shorts of the FET 106 and the output capacitor 114. Output hot plug isolation circuit 120 includes a comparator 122 and a field effect transistor (FET) 124 arranged to simulate a diode function coupled in series with the voltage output VOUT. Output hot plug isolation circuit 120 could be implemented with an actual diode which by nature prevents negative current. Comparator 122 has inputs coupled across the FET.124 and an output connected to a gate of the FET 124. The current is detected in the ORing FET 124 by measuring the FET channel resistance voltage polarity and amplitude, and used by comparator 122 to turn off the FET 124 when negative current is detected or more than an allowed amount of negative current is reached.

Input hot plug isolation circuit 130 includes an input FET 132 coupled in series with the voltage input VIN to protect for shorts of the input capacitor 112 or other circuit failure that could over current the source voltage. Input hot plug isolation circuit 130 includes an operational amplifier 134 that amplifies a voltage across the input FET 132 and provides an amplified voltage signal to a comparator 136. A resistor 138 is coupled between a first input and output of the operational amplifier 134. A first resistor 140 and a second resistor 142 are respectively connected between the first input and second input of the operational amplifier 134 and across the input FET 132. A third resistor 144 is connected between ground and the connection of the second resistor 142 and the second input of the operational amplifier 134. Current is detected in the resistance drain to source (RDSon) of the FET 132 with operational amplifier 134. If this current exceeds an over current trip point, comparator 136 trips and turns off input FET 132 via the gate input to input FET 132. Various other methods of detection of current level through FET 132 could also be used, such as, a current sense resistor.

In accordance with features of the preferred embodiment, a sliding connector is provided for slidingly receiving a circuit card, for example, carrying regulator apparatus 100, along the length of the sliding connector. The circuit card can slide through, instead of plug down on, the sliding connector for implementing hot plugging protection for a regulator card, a power supply card, a system card, or the like. Various sliding connectors are commercially available including a Ziff connector having retractable connector pins. However, conventional sliding connectors are not designed to handle hot plugging, for example, of multiple voltage outputs and/or inputs that is enabled in accordance with the preferred embodiment.

Figure 2:
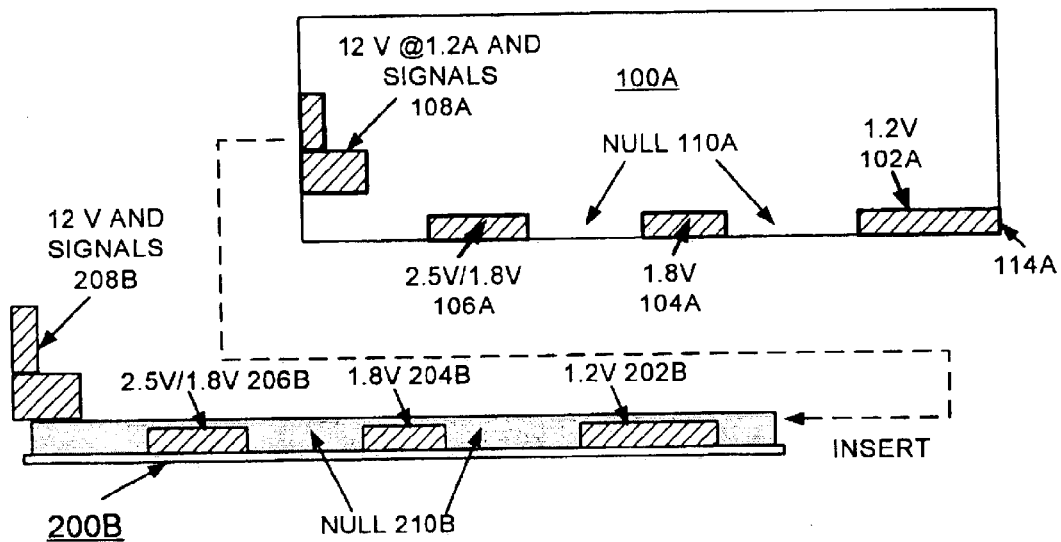
FIG. 2 is a side plan view of a hot plug sliding connector with interior contacts shown cross-hatched and an exemplary circuit card apparatus shown separately before the exemplary circuit card apparatus is slidingly inserted into the hot plug sliding connector in accordance with the preferred embodiment.
Figure 3:
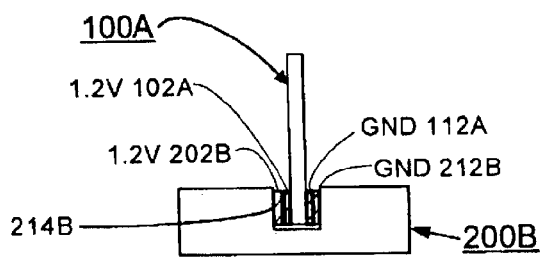
FIG. 3 is a front plan view of an assembly of the hot plug sliding connector and exemplary circuit card apparatus of FIG. 2 in accordance with the preferred embodiment.

Referring now to FIGS. 2 and 3, there are shown a hot plug sliding connector generally designated by reference character 200B and an exemplary circuit card generally designated by reference character 100A. FIG. 2 provides a side view not to scale of the hot plug sliding connector 200B with the exemplary circuit card apparatus 100A shown separately before being slidingly inserted into the hot plug sliding connector 200B in accordance with the preferred embodiment. FIG. 3 provides a front plan view of the hot plug sliding connector 200A and exemplary circuit card apparatus 100A assembled together. In FIG. 2, interior contacts of the hot plug sliding connector 200B are shown cross-hatched.

As shown in FIG. 2, the circuit card 100A is inserted into the front of the hot plug sliding connector 200B as indicated by the dashed arrow labeled INSERT and then is slidingly inserted along the length of the hot plug sliding connector 200B. The circuit card 100A includes a plurality of cooperating electrically connecting portions 102A, 104A, 106A, 108A, each for mating engagement with a respective one of a plurality of cooperating electrically connecting portions 202B, 204B, 206B, 208B of sliding connector 200B with the hot plug sliding connector 200A and exemplary circuit card apparatus 100A assembled together. Each electrically connecting portions 102A, 104A, 106A of the circuit card 100A is connected to a respective isolation circuit, such as output hot plug isolation circuit 120 or input hot plug isolation circuit 130 shown in FIG. 1.

In accordance with features of the preferred embodiment, the high impedance provided at the pads 102A, 104A, 106A of the circuit card 100A during the hot plugging operation when the circuit card is slidingly inserted through the connector 200B avoids substantially any effect on live system voltages of the connector 200B.

The plurality of cooperating electrically connecting portions 202B, 204B, 206B of the sliding connector and the plurality of cooperating electrically connecting portions 102A, 104A, 106A of the circuit card 100A are spaced apart by corresponding predefined null, non-electrically connecting portions respectively labeled NULL 210B and NULL 110A. The contacts 202B, 204B, 206B in the connector 200B are spaced apart by the null, non-electrically connecting portions NULL, 210B to prevent the circuit board contact pads 102A, 104A, 106A from being able to bridge or short together different voltage levels connected to the connector contacts 202B, 204B, 206B during the sliding insertion of the circuit card 100A into the hot plug sliding connector 200B during the hot plugging operation.

Referring also to FIG. 3, the hot plug sliding connector 200B has an elongated slot 214B carrying the plurality of cooperating electrically connecting portions or pins 202B, 204B, 206B. The electrically connecting portions or pads 102A, 104A, 106A of the circuit card 100A are spaced apart along the length of a lower card portion generally designated 114A. The lower card portion 114A carrying the plurality of cooperating electrically connecting portions 102A, 104A, 106A is slidingly received through the elongated slot 214B along the length of the hot plug sliding connector 200B during the hot plugging operation. The null spacing or stagger of pins 202B, 204B, 206B of the connector 200B and pads 102A, 104A, 106A of the circuit card 100A can be implemented simply by not populating connects in the connector.

A top side of the circuit card 100A is shown in FIG. 2 that carries the pads 102A, 104A, 106A that contact the mating contact pins 202B, 204B, 206B in the connector 200B. In the illustrated-exemplary circuit card 100A and hot plug sliding connector 200B, three voltage levels 1.2V, 1.8V, 2.5V/1.8V are shown with respective cooperating electrically connecting portions 102A, 104A, 106A; and 202B, 204B, 206B in FIG. 2 and respective mating ground contacts labeled GND 112A and GND 212B are shown in FIG. 3. The cooperating electrically connecting portions 108A and 208A at the rear end of the circuit card 100A and the hot plug sliding connector 200B are shown with a 12V and signals.

Circuit card ground contact GND 112A is provided on the opposite side of the circuit card 100A than the top card side carrying the cooperating electrically connecting portions 102A, 104A, 106A shown in FIG. 2 and the ground contact GND 212B is provided on the opposite sidewall of the elongated slot 214B carrying the cooperating electrically connecting portions 202B, 204B, 206B shown cross-hatched in FIG. 2. The mating ground contact GND 112A preferably extends the complete length of the card 100A and the connector 200B preferably has the full length of the connector contact pins defining the mating ground contact GND 212B, without bridging or shorting issues for this ground connection.

The null, electrically non-conducting portions NULL 210B enable multiple different voltage levels, such as, 1.2V, 1.8V, 2.5V/1.8V to be connected to the respective electrically connecting portions 202B, 204B, 206B of the connector 200B without being shorted or bridged by the sliding insertion for hot plug mating of circuit card 100A with the connector 200B. Further because all of the voltage inputs and outputs connected to the respective cooperating electrically connecting portions 102A, 104A, 106A of the circuit card 100A are high impedance, no problems result from sliding the circuit card 100A through the connector 200B for the hot plugging operation.

Referring also to FIGS. 4A, 4B, and 4C, there are shown side views not to scale illustrating the sliding insertion of the exemplary circuit card 100A into the hot plug sliding connector 200B in accordance with the preferred embodiment during the hot plugging operation.

FIG. 4A shows an early sliding insertion position of the circuit card 100A within the hot plug sliding connector 200B. As the circuit card 100A is sliding inserted into the connector 200B, the circuit card pad 2.5V/1.8V 106A slides through the connector pins 1.2V 202B, but being high impedance this adds no load to the 1.2V level that is live at this time. Then the circuit card pad 1.8V 104A also contacts the connector pins 1.2V 202B, but is also high impedance at this time and it is acceptable to simultaneously have both pads 2.5V/1.8V 106A and 1.8V 104A on the same output level.

Referring also to FIG. 4B, as the circuit card 100A is further sliding inserted along the elongated slot 214B of the connector 200B, the circuit card pad 1.8V 104A is located in the connector void 210B between the connector portions 1.8V 204B and 1.2V 202B. Note that the circuit card pad 1.8V 104A is not wide enough to bridge or short connector portions 1.8V 204B and 1.2V 202B across the connector void 210B. The respective corresponding non-conducting portions NULL 110A, NULL 210B separate the pads 102A, 104A, 106A of the circuit card 100A and the pins 202B, 204B, 206B of connector 200B so that the circuit board contacts 102A, 104A, 106A cannot bridge any two of the electrically conducting portions 1.2V 202B, 1.8V 204B, 2.5V/1.8V 206B of connector 200B. As the circuit card 100A is sliding inserted along the elongated slot 214B of the connector 200B, the circuit card pad 2.5V/1.8V 106A crosses the connector portion or pins 1.8V 204B, but being high impedance this has no effect on the 1.8V level. When circuit card 100A is being slidingly inserted along the elongated slot 214B during the hot plug operation, the circuit card pad 2.5V/1.8V 106A is located in the connector void 210B between the connector portions 2.5V/1.8V 206B and 1.8V 204B. Note that the circuit card pad 2.5V/1.8V is not wide enough to bridge or short the connector electrically conducting portions 1.8V 204B and 1.2V 202B across the connector void 210B.

FIG. 4C shows the circuit card 100A in a final mating position within the hot plug sliding connector 200. When the circuit card 100A comes to the final resting place the pads 102A, 104A, 106A of the circuit card 100A and contacts 202B, 204B, 206B of connector 200B are aligned in electrical contact mating engagement. At this position, the isolation FETS 124, 132 are safely turned on connecting to the system voltages provided by the contacts 202B, 204B, 206B of connector 200B.

Figure 5:
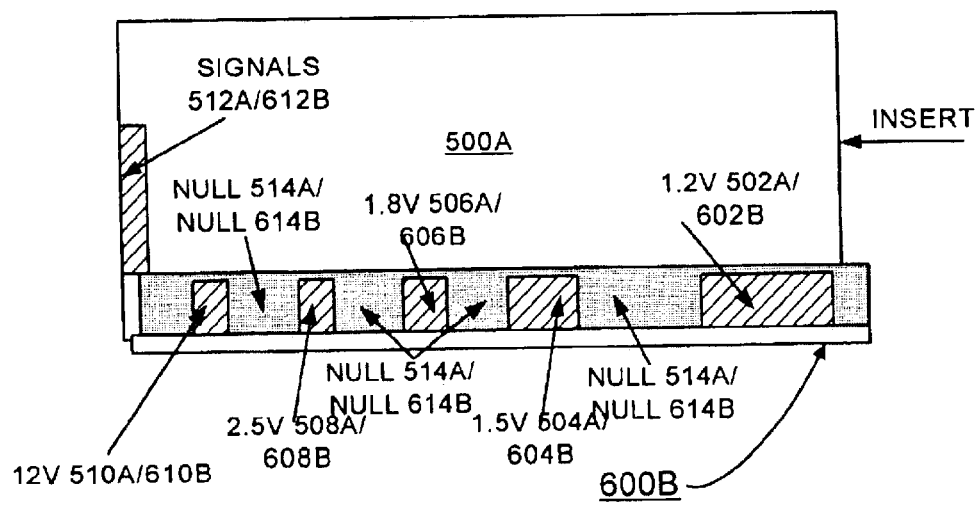
FIG. 5 is a side plan view of another hot plug sliding connector with interior contacts shown cross-hatched and exemplary circuit card apparatus in accordance with the preferred embodiment.

Referring now to FIG. 5, there is shown a side plan view not to scale of an assembly of another exemplary circuit card generally designated by reference character 500A assembled with an exemplary hot plug sliding connector generally designated by reference character 600B with interior contacts shown cross-hatched in accordance with the preferred embodiment. The exemplary circuit card 500A and hot plug sliding connector 600B have similar features as circuit card 100A and hot plug sliding connector 200B while including additional voltages.

As shown, the exemplary circuit card 500A and hot plug sliding connector 600B include a plurality of cooperating electrically connecting portions labeled 1.2V 502A/602B, 1.5V 504A/604B, 1.8V 506A/606B, 2.5V 508A/608B, 12V 510A/610B, and SIGNALS 512A, 612B for mating engagement with the circuit card 500A inserted into the illustrated final assembled position within the hot plug sliding connector 600B. The plurality of cooperating electrically connecting portions 1.2V 502A/602B, 1.5V 504A/604B, 1.8V 506A/606B, 2.5V 508A/608B, 12V 510A/610B are spaced apart by corresponding predefined null, non-electrically connecting portions respectively labeled NULL 514A/NULL 614B.

Figure 6:
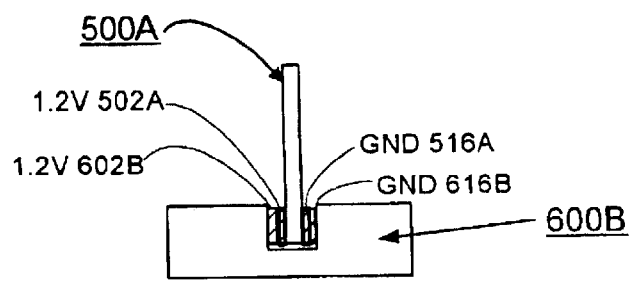
FIG. 6 is a front plan view of an assembly of the hot plug sliding connector and exemplary circuit card apparatus of FIG. 5 in accordance with the preferred embodiment.

Referring also to FIG. 6, there is shown is a front plan view not to scale of the hot plug sliding connector B00B and exemplary circuit card 500A. Respective mating ground contacts labeled GND 516A and GND 616B are shown in FIG. 3.

In both hot plug sliding connectors 200B, 600B and circuit cards 100A, 500A, the higher current voltages preferably are provided as voltage closest to the front of the systems, such as mating cooperating electrically connecting portions 102A, 202B; and 502A, 602B. This arrangement allows for the shortest distance of voids 110A/210B; and 514A/614B, hence a shortest design of the connectors 200B, 600B. It is also preferably to go from lowest voltage to highest voltage as shown for both hot plug sliding connectors 200B, 600B and circuit cards 100A, 500A due to small amount of capacitance on the FETs that is charged as the respective circuit card 100A, 500A slides through the respective hot plug sliding connector 200B, 600B. It should be understood that such preferable arrangements are not required, and various sequences of voltages for both hot plug sliding connectors 200B, 600B and circuit cards 100A, 500A can be provided.

It should be understood that a combination of a hot plug sliding connector and circuit card in accordance with the preferred embodiment can be used with various types of system cards, such as, to mate high current system cards, using the FET isolation on the power card pins as card slides through the hot plug sliding connector. The combination of a hot plug sliding connector and circuit card in accordance with the preferred embodiment can also be used for hot plugging of system logic cards, requiring that the logic pins be high impedance and that are provided on a much finer pitch than illustrated for the hot plug sliding connectors 200B, 600B and circuit cards 100A, 500A.

While the present invention has been described with reference to the details of the embodiments of the invention shown in the drawing, these details are not intended to limit the scope of the invention as claimed in the appended claims.

What is claimed is:

1. A combination of a hot plug sliding connector and a circuit card for implementing hot plugging protection for regulator cards, power supply cards, system cards and the like, said combination comprising:

the circuit card having a respective isolation circuit coupled to each voltage input and voltage output of the circuit card to be connected to the hot plug sliding connector;

the hot plug sliding connector having an elongated slot for slidingly receiving the circuit card along the length of the elongated slot through the hot plug sliding connector;

both the sliding connector and the circuit card including a plurality of cooperating electrically connecting portions for mating engagement with the circuit card inserted into a final position in the hot plug sliding connector; one of said plurality of cooperating electrically connecting portions of the circuit card connected to one said respective isolation circuit; and said plurality of cooperating electrically connecting portions of the sliding connector and the circuit card being spaced apart by a respective predefined null, non-electrically connecting portion arranged to avoid shorting between adjacent ones of said plurality of cooperating electrically connecting portions during the sliding insertion of the circuit card into the hot plug sliding connector.

2. A combination of a hot plug sliding connector and a circuit card for implementing hot plugging protection as recited in claim 1 wherein each said respective isolation circuit includes a series connected field effect transistor connected to one of said plurality of cooperating electrically connecting portions.

3. A combination of a hot plug sliding connector and a circuit card for implementing hot plugging protection as recited in claim 2 wherein said series connected field effect transistor includes an output ORing field effect transistor for limiting current flow for each voltage output of the circuit card.

4. A combination of a hot plug sliding connector and a circuit card for implementing hot plugging protection as recited in claim 2 wherein said series connected field effect transistor includes an input isolation field effect transistor for providing input over current protection for each voltage input of the circuit card.

5. A combination of a hot plug sliding connector and a circuit card for implementing hot plugging protection as recited in claim 1 wherein each said respective isolation circuit provides high impedance for said plurality of cooperating electrically connecting portions of the circuit card during the sliding insertion of the circuit card into the hot plug sliding connector.

6. A combination of a hot plug sliding connector and a circuit card for implementing hot plugging protection as recited in claim 1 wherein the circuit card includes an electrically connecting portion connected to ground potential on an opposing side of the circuit card from said plurality of cooperating electrically connecting portions of the circuit card.

7. A combination of a hot plug sliding connector and a circuit card for implementing hot plugging protection as recited in claim 6 wherein said elongated slot includes a cooperating electrically connecting portion connected to ground potential on an opposing slot side from said plurality of cooperating electrically connecting portions.

8. A combination of a hot plug sliding connector and a circuit card for implementing hot plugging protection as recited in claim 1 wherein selected ones of said plurality of cooperating electrically connecting portions near a front end of circuit card are connected to a highest current voltage, whereby a length of said predefined null, non-electrically connecting portions is minimized.

9. A method for implementing hot plugging protection for regulator cards, power supply cards, system cards and the like using a combination of a circuit card and a hot plug sliding connector having an elongated slot for slidingly receiving the circuit card along the length of the elongated slot through the hot plug sliding connector, said method comprising the steps of:

providing a plurality of cooperating electrically connecting portions carried by the circuit card and the sliding connector for mating engagement with the circuit card inserted into a final position in the hot plug sliding connector;

providing said plurality of cooperating electrically connecting portions of the sliding connector and the circuit card being spaced apart by a respective predefined null, non-electrically connecting portion arranged to avoid shorting between adjacent ones of said plurality of cooperating electrically connecting portions during the sliding insertion of the circuit card into the hot plug sliding connector; and providing a respective isolation circuit coupled to respective voltage input and voltage outputs of the circuit card and connected to one of said plurality of cooperating electrically connecting portions of the circuit card.

10. A method for implementing hot plugging protection as recited in claim 9 wherein the step of providing said respective isolation circuit includes providing an output ORing field effect transistor for limiting current flow for each voltage output of the circuit card.

11. A method for implementing hot plugging protection as recited in claim 9 wherein the step of providing said respective isolation circuit includes providing an input isolation field effect transistor for providing input over current protection for each voltage input of the circuit card.

12. A method for implementing hot plugging protection as recited in claim 9 includes the step of connecting selected ones of said plurality of cooperating electrically connecting portions near a front end of circuit card to a highest current voltage.

13. A method for implementing hot plugging protection as recited in claim 9 includes the step of providing an electrically connecting portion connected to ground potential on an opposing side of the circuit card from said plurality of cooperating electrically connecting portions of the circuit card.

14. A method for implementing hot plugging protection as recited in claim 9 includes the step of providing an electrically connecting portion connected to ground potential on an opposing side of the elongated slot from said plurality of cooperating electrically connecting portions of the hot plug sliding connector.

* * * * *